United States Patent [19] [11] 4,324,712
Vaughn, Jr. [45] Apr. 13, 1982

[54] SILICONE RESIN COATING COMPOSITION
[75] Inventor: Howard A. Vaughn, Jr., Schenectady, N.Y.
[73] Assignee: General Electric Company, Waterford, N.Y.
[21] Appl. No.: 113,278
[22] Filed: Jan. 18, 1980

Related U.S. Application Data
[63] Continuation-in-part of Ser. No. 964,910, Nov. 30, 1978.

[51] Int. Cl.³ .................. C08K 3/36; C08L 83/06; C08L 83/08
[52] U.S. Cl. .................. 524/767; 106/287.11; 106/287.12; 106/287.13; 106/287.14; 106/287.15; 106/287.16; 428/447; 524/837; 524/838
[58] Field of Search ............ 260/29.2 M; 106/287.11, 106/287.12, 287.13, 287.14, 287.15, 287.16; 428/447

[56] References Cited
U.S. PATENT DOCUMENTS

| | | | |
|---|---|---|---|
| 3,708,225 | 1/1973 | Misch et al. | 428/447 |
| 3,868,343 | 2/1975 | Stengle et al. | 260/29.2 M |
| 3,898,090 | 8/1975 | Clark | 260/29.2 M |
| 3,976,497 | 8/1976 | Clark | 260/29.2 M |
| 3,986,997 | 10/1976 | Clark | 260/29.2 M |
| 4,027,073 | 5/1977 | Clark | 260/29.2 M |
| 4,101,499 | 7/1978 | Herzig | 260/29.2 M |
| 4,177,315 | 12/1979 | Ubersax | 260/29.2 M |
| 4,197,230 | 4/1980 | Baney et al. | 260/29.2 M |

FOREIGN PATENT DOCUMENTS 765890  9/1971  Belgium .................. 428/447

OTHER PUBLICATIONS

Hackh's Chemical Dictionary, Fourth Edition, 1969, p. 168.

Primary Examiner—Allan Lieberman
Attorney, Agent, or Firm—Hedman, Casella, Gibson & Costigan

[57] ABSTRACT

Silicone resin coating compositions, having a basic pH in the range of from 7.1 to 7.8 are provided. These coating compositions are prepared by hydrolyzing an alkyltrialkoxysilane or aryltrialkoxysilane in an aqueous colloidal silica dispersion and adding to the resultant hydrolysis product a linear functionally terminated oligomeric siloxane. When applied to a solid substrate, these silicone resin compositions provide an abrasion resistant coating having improved resistance to cracking.

11 Claims, No Drawings

SILICONE RESIN COATING COMPOSITION

CROSS-REFERENCE TO RELATED APPLICATIONS

This application is a continuation-in-part of copending application U.S. Ser. No. 964,910, filed Nov. 30, 1978, incorporated herein by reference.

BACKGROUND OF THE INVENTION

This invention relates to a protective coating composition. More particularly, it relates to a silicone resin coating composition which, when applied to a substrate, forms a protective, abrasion-resistant coating having improved crack resistance.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

While these aforementioned coating formulations have been found acceptable, there still remains room for improvement. For example, the coating compositions of this invention provide coatings having improved resistance to moisture and humidity and ultraviolet light, in comparison with those coatings provided in accordance with U.S. Pat. No. 3,986,997. Moreover, it has been found herein that in direct contrast to the teachings of U.S. Pat. No. 3,986,997, the basic coating compositions of this invention having a pH in the range of from 7.1–7.8, do not immediately gel and provide excellent coatings having good properties on solid substrates. Furthermore, the compositions provided herein, while still possessing all of the advantages disclosed in copending U.S. application Ser. No. 964,910, filed Nov. 30, 1978, possess improved resistance to deleterious cracking.

Protective coatings for metals, bright or dull, are also needed. For example, bright metallized plastics, wherein small amounts of metal are vacuum sputtered or vacuum metallized over the plastic, now popular with the auto industry because of their light weight, need protective layers to prevent scratching and marring of the brilliant surface. Metal wheel covers (hub caps) also require protective coatings for their preservation and lasting beauty.

SUMMARY OF THE INVENTION

Accordingly, it is one object of the present invention to provide a new protective coating resin for solid substrates.

Another object of this invention is to provide a coating resin for solid substrates which, when applied to the substrate, will provide an abrasion-resistant surface thereto having especially improved crack resistance.

Still another object of the present invention is to provide a coating composition, especially well suited for providing an abrasion resistant and crack resistant coating surface to transparent substrates.

A further object of this invention is to provide a protective coating resin which is readily applicable to a substrate and which, when applied, provides an improved coating which is resistant to cracking, as well as resistant to deterioration from moisture, humidity and ultraviolet light.

A still further object of the present invention is to provide a coating resin composition also suitable to provide a protective coating for metals and metallized surfaces.

These and other objects are accomplished herein by a coating composition comprising a mixture of colloidal silica, an aliphatic alcohol-water solution of the partial condensate of a silanol of the formula $RSi(OH)_3$, wherein R is selected from group consisting of alkyl having from 1 to 3 carbon atoms and aryl, and a functionally terminated oligosiloxane having the general formula

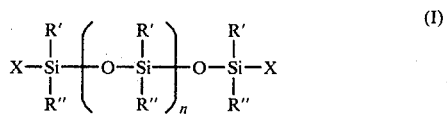 (I)

wherein X is hydroxy, alkoxy,

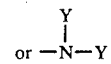

wherein Y is hydrogen or alkyl, R' and R" may be the same or different and are selected from the group consisting of alkyl, haloalkyl, cyanoalkyl and alkenyl and n is from about 1 to about 18, at least 70 weight percent of the silanol being $CH_3Si(OH)_3$, said composition containing 10 to 50 weight percent solids, said solids consisting essentially of 10 to 70 weight percent colloidal silica, 30 to 90 weight percent of the partial condensate and 0.5 to 5 weight percent of the functionally terminated oligosiloxane, said composition having a pH from 7.1 to about 7.8.

DETAILED DESCRIPTION OF THE INVENTION

In one embodiment of the present invention, the linear functionally terminated oligomeric siloxane, defined hereinbefore, is blended with the resin prepared by hydrolyzing a trialkoxysilane or mixture of trialkoxysilanes of the formula RSi(OR)$_3$ defined hereinbefore, in an aqueous dispersion of colloidal silica. In another embodiment of the present invention, the coating compositions of this invention are prepared by co-hydrolyzing a trialkoxysilane or a mixture of trialkoxysilanes of the formula RSi(OR)$_3$, wherein R is alkyl of from 1 to 3 carbons or aryl, such as phenyl, and the linear functionally terminated oligomeric siloxane in an aqueous dispersion of colloidal silica. In either procedure, blocks of the linear oligomeric siloxane are incorporated into the final resin structure. It has been surprisingly discovered herein that these added siloxane blocks impart a degree of flexibility to the cured resin which vastly reduces the tendency of the cured resins to crack.

Aqueous colloidal silica dispersions, which are suitable for the purposes of this invention, generally have particle sizes of from 5 to 150 millimicrons in diameter. These silica dispersions are well known in the art and commercially available ones include, for example, those sold under the trademarks of Ludox (duPont) and Nalcoag (NALCO Chemcial Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., Na$_2$O) yield a more stable coating composition. Thus, colloidal silicas having an alkali content of less than 0.35% (calculated as Na$_2$O) have been found to be preferable. Moreover, colloidal silicas having an average particle size of from 10 to 30 millimicrons are also preferred. A particularly preferred aqueous colloidal silica dispersion for the purposes herein is known as Ludox LS, sold by duPont Company. Nalcoag 1050 (an aqueous colloidal silica dispersion wherein the mean particle diameter is 20 millimicrons) is also used herein.

Thus, in accordance with the present invention, the aqueous colloidal silica dispersion is added to a solution of a small amount of glacial acetic acid (or an alkyltriacetoxysilane) in an alkyltrialkoxysilane or aryl trialkoxysilane. The glacial acetic acid or the alkyltriacetoxysilane is used to buffer the basicity of the initially two liquid phase reaction mixture and thereby also temper the hydrolysis rate. For the purposes herein, from about 0.07 parts by weight to about 0.1 parts by weight, based on 100 parts by weight of the total composition, of glacial acetic acid or alkyltriacetoxy silane is used. While the use of glacial acetic used or alkytriacetoxysilane is preferred, other organic acids like propionic, butyric, citric, benzoic, formic, oxalic and the like may be used. Alkyltriacetoxysilanes wherein the alkyl group contains from 1 to 6 carbon atoms can be used, alkyl groups having from 1 to 3 carbon atoms being preferred. The temperature of the reaction mixture is maintained at about 20° C. to about 40° C., preferably 20° C. to about 30° C., and most preferably below 25° C. In about six to eight hours sufficient trialkoxysilane has hydrolyzed so as to reduce the initially two phase liquid mixture to one liquid phase in which the now treated silica (i.e., treated by its admixture with the alkyltrialkoxysilane or aryltrialkoxysilane) is dispersed.

In general, the hydrolysis reaction is allowed to continue for a total of about 12 to 48 hours, preferably about 16 hours, depending upon the desired viscosity of the final product. The more time the hydrolysis reaction is permitted to continue, the higher will be the viscosity of the product. After the hydrolysis has been completed to the desired extent, the solids content is adjusted by the addition of alcohol, preferably isobutanol, to the reaction mixture. The linear functionally terminated oligosiloxane hereinbefore described, is then added to this resin mixture and thoroughly mixed therewith. On the other hand, the oligosiloxane may be added to the hydrolysis mixture before dilution with alcohol or even simultaneously with dilution. To facilitate mixing, the oligosiloxane may be added in solution in alcohol, i.e., generally the same alcohol used to adjust the solids content of the resin. Other suitable alcohols for the purposes herein include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butyl cellosolve and the like in amounts, like up to about 50 weight percent of the co-solvent system can also be used. The solids content of the coating compositions of this invention is generally preferred to be in the range of from about 10 to 25%, most preferably, from about 13 to 22%, by weight of the total composition. The pH of the resultant coating composition is in the range of from about 7.1 to about 7.8, preferably higher than 7.2. If necessary, dilute base, such as ammonium hydroxide or weak acid, such as acetic acid, can be added to the composition to adjust the final pH to this desired range. At these basic pH's, the compositions are translucent liquids which are stable at room temperature for at least several weeks. When stored at temperatures below about 5° C. (40° F.) the period of stability is increased further.

As indicated hereinbefore, the linear functionally terminated oligosiloxane may be incorporated into the resin composition herein by cohydrolyzing the oligomer and the trialkoxysilane in the aqueous colloidal silica dispersion. The procedure is generally carried out by adding the aqueous colloidal silica dispersion to a solution of a small amount of glacial acetic acid (or alkyltriacetoxysilane) in the trialkoxysilane. The hydrolysis conditions used in this embodiment are the same as those described hereinabove.

Typical linear functionally terminated oligosiloxanes useful in the practice of the present invention and encompassed by Formula I hereinabove, include, for example, hydroxy-terminated poly(dimethylsiloxane), methoxy-terminated poly(dimethylsiloxane), isopropyl amino-terminated poly(dimethylsiloxane), hydroxy-terminated poly(methyltrifluoropropyl)siloxane and the like.

The use of these linear functionally terminated oligosiloxanes in amounts of from about 0.5% to about 5% by weight of the total solids content of the coating composition resin will greatly improve the cured resin's crack resistance. Tests have shown that if the oligomer is cohydrolyzed into the resin, lesser amounts than if the oligomer is blended into the resin, are necessary to provide the improved cracking resistance. In any event, these amounts are within the range described hereinbefore.

Other additives and modifying agents, such as thickeners, pigments, dyes and the like, may also be added to the resin composition after hydrolysis. A particularly desirable additive has been found to be a small amount of a polysiloxane polyether copolymer flow control additive. It has been found, and is the subject of another invention disclosed in a copending U.S. application Ser. No. 964,911, filed Nov. 30, 1978 now U.S. Pat. No. 4,277,287, July 7, 1981, that these polysiloxane polyether copolymers prevent the occurrence of undesirable flowmarks and dirtmarks which sometimes occur with the application of the coating composition onto the substrate. A particularly useful polysiloxane polyether copolymer for the purposes herein is known as SF-1066 available from the General Electric Company and BYK-300 sold by Mallinkrodt. The preparation, further description and structural formulae for these polysiloxane polyether copolymers are found in U.S. Pat. No. 3,629,165, incorporated herein by reference. Generally, these polysiloxane polyether copolymers may be employed in amounts of from about 2.5% to about 15% by weight of the total solids content of the composition.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing method, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

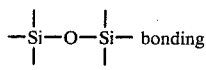 bonding occurs. This condensation takes place over a period of time and is not an exhaustive condensation but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

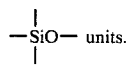 units.

The non-volatile solids portion of the coating composition herein is a mixture of colloidal silica, the partial condensate (or siloxanol) of a silanol and the functionally terminated oligosiloxane. The major portion of all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating composition herein. In the preferred coating compositions herein the partial condensate is present in an amount of from about 55 to 75 weight percent of the total solids in a cosolvent of alcohol and water, the alcohol comprising from about 50% to 95% by weight of the cosolvent.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethylanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalysts in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°-150° C. to provide a transparent abrasion resistant surface coating.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers, like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. As noted above, the coating compositions of this invention are especially useful as coatings for polycarbonates, such as those polycarbonates known as Lexan ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will airdry to a tack-free condition, but heating in the range of 75° C. to 200° C. is necessary to obtain condensation of residual silanols in the partial condensate. This final cure results in the formation of silsesquioxane ($RSiO_{3/2}$) moieties linked together by short chains formed by the condensation of the partial condensate and simultaneous co-condensation with the functionally terminated oligosiloxane. In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention, the following examples are given by way of illustration and not by way of limitation.

EXAMPLE 1

The following four formulations are prepared by first blending the silane, the oligomer and acetic acid. Then the silica sol is added to that solution with good agitation. The isobutanol is added 24 hours after the silica addition to dilute the reaction mixture to 20% solids. Amounts of materials are in parts by weight.

TABLE I

|  | A | B | C | D |
|---|---|---|---|---|
| Methyltrimethoxysilane | 240.6 | 242.0 | 240.6 | 242.0 |
| Glacial Acetic Acid | 0.72 | 0.72 | 0.72 | 0.72 |
| 30% Nalcoag 1050 | 200 | 200 | 200 | 200 |
| hydroxyterminated poly- |  |  |  |  |
| (dimethylsiloxane)* | 2.0 | 1.0 |  |  |
| Methoxystopped poly- |  |  |  |  |
| dimethylsiloxane)** |  |  | 2.0 | 1.0 |
| Isobutanol | 459 | 457 | 459 | 457 |

*degree of polymerization 6–7 (n = 4–5)
**degree of polymerization 9.8 to 16.1 (n = 7.8 to 14.1)

Each of the above resin solutions is coated and cured on two transparent polycarbonate plaques, one primed with 2% Rhoplex AC-658, thermosetting acrylic emulsion, and the other with 4% Rhoplex AC-658. The primer is dried at room temperature and cured for 30 minutes at 120° C. The silicone resins are dried at room temperature and cured for one hour at 120° C. There are no cracks in the cured films. The plaques have a more slippery feel to them than those coated with unmodified resin. The abrasion resistance is determined by measuring the change in haze with a Gardner haze meter after abrading for 500 cycles on a Taber Abrazer with CS-10F wheels with a 500 g load on each wheel. The change in percent haze is tabulated below.

TABLE I (Cont'd)

| Sample | Δ % Haze | |
|---|---|---|
|  | 2% Primer | 4% Primer |
| A | 4.45 | 4.2 |
| B | 3.0 | 3.9 |
| C | 4.5 | 4.7 |
| D | 4.0 | 4.2 |
| Control | — | 3.95 |

Rhoplex AC-658 is a product of Rohm and Haas, and is a copolymer of n-butylmethacrylate and methylmethacrylate having hydroxy functionality crosslinked with a substituted melamine, diluted herein to 4% solids by using a mixture of 875 parts by weight distilled water, 470 parts by weight 2-butoxyethanol and 125 parts by weight Rhoplex AC-658. 2% solids is achieved by similar further dilution.

EXAMPLE 2

A series of 4 coating resins is prepared using the amounts of reactants listed in Table II below. The reactions are conducted by adding the colloidal silica to a stirring solution of the methyltrimethoxysilane, methyltriacetoxysilane and varying polysiloxane oligomers (when used). After stirring at ambient temperature for 24 hours, the reaction mixture is diluted with isobutanol to obtain a final solution containing approximately 20% solids by weight. Amounts of materials are in parts by weight.

TABLE II

|  | A | B | C | D |
|---|---|---|---|---|
| methyltrimethoxysilane | 203.4g | 202.8g | 201.4g | 201.1g |
| methyltriacetoxysilane | 0.74 | 0.74 | 0.74 | 0.74 |
| Ludox LS (12 millimicrons) | 166.8 | 166.8 | 166.8 | 166.8 |
| Isobutanol | 380 | 380 | 380 | 380 |
| hydroxy terminated poly-(dimethylsiloxane)(n = 4–5) | 0 | 0.6 | 2.0 | 0.0 |
| methoxy stopped poly(dimethylsiloxane)(n = 7.8 to 14.1) |  |  |  |  |
| RS Lamp Induced microcracking | ~167hrs | ~167hrs | ~288hrs | ~452hrs |
| 120° C. Oven induced microcracking | <41 hrs | <41hrs | <166hrs | <177hrs |
| Recoated 2 wks. later |  |  |  |  |
| Abrasion Resistance (Δ % Haze, 500 cycles) | 1.7 | 1.4 | 1.8 | 2.3 |
| RS Sunlamp Cracks | ~430hrs | ~291hrs | ~485hrs | ~598hrs |
| 120° C. Oven Cracks | ~99hrs | ~99hrs | ~99hrs | ~99hrs |

After standing at room temperature for 3 days, the coatings are filtered and flowcoated (without a flow control agent) onto glass panels. B and C produced smooth coats; D exhibited some flow marks.

Three weeks later, a flow control agent (SF-1066) is added at 4% by weight of solids and the 4 coatings are applied by flowcoating to 6"×8"×¼" plaques of transparent Lexan ® polycarbonate sheet previously primed with the same thermosetting acrylic emulsion described in Example 1.

The coating plaques are subjected to both a 120° C. thermal soak test (in a convection oven) and an accelerated sunlight test (exposure to General Electric RS Lamps). All of the test plaques are thoroughly examined several times a week for the first signs of microcracking (using an illuminated magnifier) or loss of scribed adhesion. The data are tabulated above in Table II. Two weeks later, the formulations are coated again as above and retested. In addition, the coatings' abrasion resistance is evaluated. These data also appear in the table. These experiments demonstrate that cohydrolysis of hydroxy terminated poly(dimethylsiloxane) or methoxy terminated poly(dimethylsiloxane) at 1% of the methyltrimethoxysilane significantly improves crack resistance to RS lamp exposure and the improvement is retained even after 5 weeks of room temperature storage. No adhesion loss occurred during these tests, and the abrasion resistance is excellent.

EXAMPLE 3

A coating composition containing the same ingredients as the control composition (i.e., that not containing the oligosiloxane) in Example 2, and prepared similarly thereto has a tendency to crack slightly when coated and cured on primed Lexan ® transparent polycarbonate. To a portion of this coating composition is added hydroxy terminated poly(dimethylsiloxane), n=4-5 at 5% by weight of solids, and thoroughly blended therewith. The treated and untreated coating compositions are coated as above, cured and examined: the untreated coating produces ¼" long cracks at the bottom of the placque, the treated coating is crack-free.

The crack-free specimen is subjected to the same tests used in Example 2. It has Δ% H$_{500}$=4.8, it does not show microcracking till 540 hours of RS lamp exposure, and it remains crack-free after 1220 hours of thermal soak in a 120° C. oven. One week later, the same crackprone resin is treated with various concentrations of hydroxy terminated poly(dimethylsiloxane) and tested as before. These results are tabulated below. No adhesion loss is seen during the tests.

TABLE III

|  | A | B | C | D |
|---|---|---|---|---|
| *Oligosiloxane as percent of coating solids | 0 | 1.3% | 2.5% | 5.0% |
| Appearance (after cure) | 2-3" cracks | ¼" cracks | crack-free | crack-free |
| Microcracking from RS lamps after | 139 hrs. | 293 hrs. | 293 hrs. | 379 hrs. |
| Microcracking from 120° C. Oven after | <43 hrs. | <43 hrs. | <43 hrs. | <888 hrs. |

*hydroxyterminated poly(dimethylsiloxane) n = 4-5

These results demonstrate that adding oligosiloxane to the finished resin at 5% by weight of solids significantly retards the onset of cracking from thermal or sunlamp exposure and prevents initial cracking during cure.

EXAMPLE 4

The same crack prone coating composition as that used in Example 3 is applied to a large panel of Lexan ® transparent polycarbonate (4'×1'×¼") primed as in Example 1. Inspection of cured topcoat revealed some cracks in the lower 2' of the panel (it is flow-coated with the 4' dimension as the vertical). A second panel coated identically except that hydroxy terminated poly(dimethylsiloxane), n=4-5, is added to the resin at 4% the weight of solids (added as a solution in isobutanol to facilitate efficient mixing) is crack-free after cure. Thus, it is seen that the additive can upgrade crack-prone coatings to permit application to even large substrates (where wedging effects can promote cracking).

Obviously, other modifications and variations of the present invention are possible in the light of the above teachings. For example, additives, and other modifying agents, such as pigments, dyes, thickeners, ultraviolet light absorbers and the like, may be added to the compositions of this invention. It is to be understood, however, that changes may be made in the particular embodiments described above which are within the full intended scope of the invention or defined in the appended claims.

I claim:

1. An aqueous coating composition comprising a mixture of colloidal silica, a lower aliphatic alcohol-water solution of the partial condensate of a silanol of the formula RSi(OH)$_3$, wherein R is selected from the group consisting of alkyl having from 1 to 3 carbon atoms and aryl, and flexibilizing amount of a linear functionally terminated oligosiloxane having the general formula,

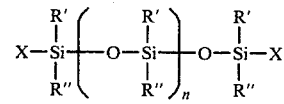

wherein X is selected from the group consisting of hydroxy, alkoxy,

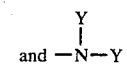

wherein Y is hydrogen or alkyl, R' and R" may be the same or different and are selected from the group consisting of alkyl, haloalkyl, cyanoalkyl and alkenyl and n is a number from about 1 to about 18, at least 70 weight percent of the silanol being CH$_3$Si(OH)$_3$, said composition containing 10 to 50 weight percent solids consisting essentially of 10 to 70 weight percent colloidal silica, 30 to 90 weight percent of the partial condensate, and 0.5 to 5 weight percent of said linear functionally terminated oligosiloxane, said composition having a pH of 7.1 to about 7.8.

2. A coating composition as defined in claim 1 wherein the aliphatic alcohol is a mixture of methanol and isobutanol.

3. A coating composition as defined in claim 1, wherein said partial condensate is of CH$_3$Si(OH)$_3$.

4. A coating composition as defined in claim 1 wherein the pH is about 7.2 to 7.8.

5. A coating composition as defined in claim 1 wherein the linear functionally terminated oligosiloxane is selected from the group consisting of hydroxy terminated poly(dimethylsiloxane) and methoxy terminated poly(dimethylsiloxane).

6. A coating composition as defined in claim 5 wherein the degree of polymerization of the hydroxy terminated poly(dimethylsiloxane) is 6 to 7 and the degree of polymerization of the methoxy terminated poly(dimethylsiloxane) is 9.8 to 16.1.

7. A coating composition as defined in claim 1 wherein the linear functionally terminated oligosiloxane is present in an amount comprising from about 0.5% to about 5% by weight of the total solids content of the composition.

8. A coating composition as defined in claim 1, wherein the composition contains about 20% solids, the partial condensate is of CH$_3$Si(OH)$_3$, the aliphatic alcohol is a mixture of methanol and isobutanol and the linear functionally terminated oligosiloxane is selected from the group consisting of hydroxy terminated poly(dimethylsiloxane) and methoxy terminated poly(dimethylsiloxane).

9. An aqueous coating composition comprising a mixture of colloidal silica, an aliphatic alcohol-water solution of the partial condensate of a silanol of the formula RSi(OH)$_3$, wherein R is selected from the group consisting of alkyl having from 1 to 3 carbon atoms and phenyl, and flexibilizing amount of a linear functionally terminated oligosiloxane having the general formula,

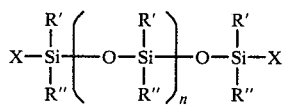

wherein X is selected from the group consisting of hydroxy, alkoxy,

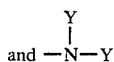

wherein Y is hydrogen or alkyl, R' and R" may be the same or different and are selected from the group consisting of alkyl, haloalkyl, cyanoalkyl and alkenyl and n is a number from about 1 to about 18, at least 70 weight percent of the silanol being CH$_3$Si(OH)$_3$, said composition containing 10 to 50 weight percent solids consisting essentially of 10 to 70 weight percent colloidal silica of from 5 to 150 microns in diameter, 30 to 90 weight percent of the partial condensate, and 0.5 to 5 weight percent of said linear functionally terminated oligosiloxane, said composition having a pH of 7.1 to about 7.8, said aliphatic alcohol being selected from methanol, ethanol, propanol, isopropanol, n-butyl alcohol, t-butyl alcohol or a mixture thereof.

10. An aqueous coating composition prepared by admixing an aqueous colloidal silica dispersion of from 5 to 150 microns in diameter with a solution of alkyltriacetoxysilane or glacial acetic acid in an alkyltrialkoxysilane, wherein alkyl is from 1 to 3 carbon atoms, maintaining the temperature of the admixture at from about 20° C. to about 30° C. for a sufficient time to reduce the reaction mixture to one liquid phase, maintaining the pH of the composition in the range of from about 7.1 to about 7.8 and to the resultant product thoroughly admixing a flexibilizing amount of a linear functionally terminated oligosiloxane having the general formula,

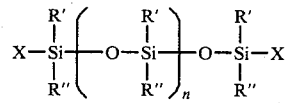

wherein X is selected from the group consisting of hydroxy, alkoxy,

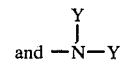

wherein Y is hydrogen or alkyl, R' and R" may be the same or different and are selected from the group consisting of alkyl, haloalkyl, cyanoalkyl and alkenyl and n is from about 1 to about 18 in in an amount at least sufficient to impart enough flexibility to the composition when applied as a coating and cured to resist cracking.

11. An aqueous coating composition prepared by admixing an aqueous colloidal silica dispersion of 5 to 150 microns in diameter with a solution of an alkyltriacetoxysilane, wherein alkyl is from 1 to 3 carbon atoms or glacial acetic acid, a trialkoxysilane wherein alkyl is from 1 to 3 carbon atoms and a flexibilizing amount of a linear functionally terminated oligosiloxane having the general formula,

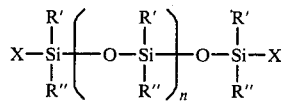

wherein X is selected from the group consisting of hydroxy, alkoxy,

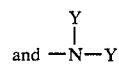

wherein Y is hydrogen or alkyl, R' and R" may be the same or different and are selected from the group consisting of alkyl, haloalkyl, cyanoalkyl and alkenyl, and n is a number from 1 to 18, maintaining the temperature of the admixture at from about 20° C. to about 30° C. for a sufficient time to reduce the reaction mixture to one liquid phase, maintaining the pH of the composition in the range of from about 7.1 to 7.8, and adjusting the solids content of the reaction mixture by the addition of a lower aliphatic alcohol thereto.

* * * * *